US008504852B2

(12) United States Patent
Beard

(10) Patent No.: US 8,504,852 B2
(45) Date of Patent: *Aug. 6, 2013

(54) BATTERY POWERED DEVICE WITH DYNAMIC POWER AND PERFORMANCE MANAGEMENT

(75) Inventor: Paul Beard, Milpitas, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.
This patent is subject to a terminal disclaimer.

(21) Appl. No.: 13/038,112

(22) Filed: Mar. 1, 2011

(65) Prior Publication Data

US 2011/0225436 A1     Sep. 15, 2011

Related U.S. Application Data

(63) Continuation of application No. 12/120,145, filed on May 13, 2008, now Pat. No. 7,900,067, which is a continuation of application No. 11/152,402, filed on Jun. 14, 2005, now Pat. No. 7,376,848, which is a continuation of application No. 09/735,406, filed on Dec. 12, 2000, now Pat. No. 6,928,559, which is a continuation of application No. 08/882,990, filed on Jun. 26, 1997, now abandoned.

(51) Int. Cl.
*G06F 1/26* (2006.01)
*G06F 1/32* (2006.01)

(52) U.S. Cl.
USPC ........... 713/300; 713/320; 713/322; 713/330; 323/234

(58) Field of Classification Search
USPC ................. 713/300, 320, 322, 330; 323/234
See application file for complete search history.

(56) References Cited

U.S. PATENT DOCUMENTS 4,176,354 A   11/1979   Hsiao
4,254,475 A   3/1981   Cooney et al.

(Continued)

FOREIGN PATENT DOCUMENTS

EP   0712064   5/1996
JP   53-121509   10/1978

(Continued)

OTHER PUBLICATIONS

Williams; Low Voltage Imbedded Design, INTEL AP-477; Application Note; Feb. 1993.

(Continued)

*Primary Examiner* — Kim Huynh
*Assistant Examiner* — Michael J Brown
(74) *Attorney, Agent, or Firm* — Brinks Hofer Gilson & Lione

(57) ABSTRACT

A computing device operates over a range of voltages and frequencies and over a range of processor usage levels. The computing device includes at least a variable frequency generator, a variable voltage power supply and voltage supply level and clocking frequency management circuitry. The variable frequency generator is coupled to the processor and delivers a clock signal to the processor. The variable voltage power supply is coupled to the processor and delivers voltage to the processor. The voltage supply level and clocking frequency management circuitry adjust both the voltage provided by the variable voltage power supply and the frequency of the signal provided by the variable frequency generator. The computing device includes a temperature sensor that provides signals indicative of the temperature of the processor and the voltage supply level and clocking frequency management circuitry adjusts the voltage and/or the clocking frequency provided by the variable voltage power supply. The computing device may also include a fan controlled by the voltage supply level and clocking frequency management circuitry, the fan adjusting the temperature of the processor when activated. In cold weather applications, the computing device may further include a heater controlled by the voltage supply level and clocking frequency management circuitry that raises the temperature of the processor when activated.

28 Claims, 10 Drawing Sheets

(56) References Cited

U.S. PATENT DOCUMENTS

| | | |
|---|---|---|
| 4,317,181 A | 2/1982 | Teza |
| 4,675,770 A | 6/1987 | Johansson |
| 4,709,403 A | 11/1987 | Kikuchi |
| 4,823,292 A | 4/1989 | Hillion |
| 4,885,521 A | 12/1989 | Crampton |
| 4,899,269 A | 2/1990 | Rouzies |
| 4,980,836 A | 12/1990 | Carter et al. |
| 5,021,679 A | 6/1991 | Fairbanks |
| 5,053,943 A | 10/1991 | Yokoyama |
| 5,086,501 A | 2/1992 | DeLuca |
| 5,142,684 A | 8/1992 | Perry et al. |
| 5,167,024 A | 11/1992 | Smith |
| 5,179,493 A | 1/1993 | Imanishi |
| 5,220,672 A | 6/1993 | Nakao |
| 5,230,056 A | 7/1993 | Hoshina |
| 5,254,888 A | 10/1993 | Lee |
| 5,254,992 A | 10/1993 | Keen |
| 5,257,202 A | 10/1993 | Feddersen et al. |
| 5,274,798 A | 12/1993 | Aihara |
| 5,300,835 A | 4/1994 | Assar et al. |
| 5,307,003 A | 4/1994 | Fairbanks |
| 5,307,257 A | 4/1994 | Fukushima |
| 5,367,638 A | 11/1994 | Niessen |
| 5,369,771 A | 11/1994 | Gettel |
| 5,390,333 A | 2/1995 | Pritt |
| 5,402,524 A | 3/1995 | Bauman et al. |
| 5,428,790 A | 6/1995 | Harper |
| 5,446,904 A | 8/1995 | Belt |
| 5,457,801 A | 10/1995 | Aihara |
| 5,469,561 A | 11/1995 | Takedo |
| 5,475,847 A | 12/1995 | Ikeda |
| 5,479,644 A | 12/1995 | Hongo |
| 5,483,464 A | 1/1996 | Song |
| 5,502,838 A | 3/1996 | Kikinis |
| 5,515,134 A | 5/1996 | Taguchi |
| 5,546,568 A | 8/1996 | Bland |
| 5,560,024 A | 9/1996 | Harper |
| 5,627,412 A | 5/1997 | Beard |
| 5,632,039 A * | 5/1997 | Walker et al. ............ 713/300 |
| 5,682,118 A | 10/1997 | Kaenel |
| 5,713,030 A | 1/1998 | Evoy |
| 5,719,800 A | 2/1998 | Mittal et al. |
| 5,727,193 A | 3/1998 | Takeuchi |
| 5,734,585 A | 3/1998 | Beard |
| 5,745,375 A | 4/1998 | Reinhardt |
| 5,745,773 A | 4/1998 | Mizuta |
| 5,778,237 A | 7/1998 | Yamamoto et al. |
| 5,781,783 A * | 7/1998 | Gunther et al. ............ 713/320 |
| 5,787,294 A | 7/1998 | Evoy |
| 5,787,369 A | 7/1998 | Knaak |
| 5,812,860 A | 9/1998 | Horden et al. |
| 5,825,674 A | 10/1998 | Jackson |
| 5,832,284 A | 11/1998 | Michail et al. |
| 5,848,282 A | 12/1998 | Kang |
| 5,926,394 A * | 7/1999 | Nguyen et al. ............ 323/271 |
| 5,987,244 A | 11/1999 | Kau et al. |
| 6,006,168 A | 12/1999 | Schumann et al. |
| 6,014,611 A | 1/2000 | Arai et al. |
| 6,062,202 A | 5/2000 | Chasteen |
| 6,141,762 A | 10/2000 | Nicol et al. |
| 6,216,235 B1 | 4/2001 | Thomas et al. |
| 6,311,287 B1 | 10/2001 | Dischler |
| 6,928,559 B1 * | 8/2005 | Beard ............ 713/300 |
| 7,900,067 B2 * | 3/2011 | Beard ............ 713/300 |

FOREIGN PATENT DOCUMENTS

| | | |
|---|---|---|
| JP | 54-014624 | 2/1979 |
| JP | 54-148430 | 11/1979 |
| JP | 54-041018 | 12/1979 |
| JP | 55-076418 | 6/1980 |
| JP | 56-017414 | 2/1981 |
| JP | 56-017415 | 2/1981 |
| JP | 56-076821 | 6/1981 |
| JP | 57-081630 | 5/1982 |
| JP | 57-081728 | 5/1982 |
| JP | 57-147190 | 9/1982 |
| JP | 58-090226 | 5/1983 |
| JP | 58-171842 | 10/1983 |
| JP | 58-195218 | 11/1983 |
| JP | 60-010318 | 1/1985 |
| JP | 60-039223 | 3/1985 |
| JP | 60-107121 | 6/1985 |
| JP | 61-048019 | 3/1986 |
| JP | 61-217816 | 9/1986 |
| JP | H1-157269 | 6/1989 |
| JP | H2-56622 | 2/1990 |
| JP | H2-121019 | 5/1990 |
| JP | H4-134510 | 5/1992 |
| JP | H4-128052 | 11/1992 |
| JP | H5-11897 | 1/1993 |
| JP | H5-56559 | 5/1993 |
| JP | H5-333997 | 12/1993 |
| WO | 9306543 | 4/1993 |

OTHER PUBLICATIONS

Lee et al., Novel-Class-E Converters, PESC '89 Record vol. I; 20th Annual IEEE Power Electronics Specialists Conference; 1989 IEEE.

*Case Management Order in Qualcomm Inc. v. Broadcom Corp.* 05-CV-1392 B (BLM); Dec. 12, 2005.

Rebuttal Expert Report of Charles Neuhauser Regarding the Validity of U.S. Patent 5,627,412; Dec. 18, 2006.

Qualcomm Prior Art list for 5,627,412; Dec. 13, 2006.

Expert Report of Clyde Brown Regarding Invalidity of '412; Jan. 15, 2004.

Lyon; Cost, Power, and Parallelism in Speech Signal Processing; IEEE Custom Integrated Circuit Conference; 1993.

Melear; Hardware and Software Techniques for Power Conversion in Portable Devices; WESCON/94 Conference Record; Sep. 1994.

Berndlmaier et al.; "Delay Regulation—A Circuit Solution to the Power/Performance Tradeoff"; IBM J. Res. Develop.; vol. 25; No. 3; May 1980.

Shapiro; "Dynamic Power Management by Clock Speed Variation"; IBM Technical Disclosure Bulletin; pp. 373; Jan. 1990.

Liu et al.; Trading Speed for Low Power by Choice of Supply and Threshold Voltages; IEEE Journal of Solid-State Circuits; vol. 28; No. 1; Jan. 1993.

Vargha; "Squeeze More Working Hours From Battery-Powered PCs"; Electronic Design; pp. 104-116; Oct. 15, 1992.

ST Micro Invalidity Claim Charts; May 23, 2003.

EIA/JEDEC STandard 8-0; 1984.

Burd et al.; "Energy Efficient CMOS Microprocessor Design"; Proceedings of the 28th Annual HICSS Conference; pp. 288-297; Jan. 1995.

Expert Report of Jonathan R. Wood Regarding the Invalidity of U.S. Patent No. 5,627,412 (with Exhibits A-E).

Gwennap, "Hittachi, NEC Processors Take Aim at PDAs' new RISC Architectures Tuned for Low-Cost Applications (Personal digital assistants, Hitachi America Reduced Instruction Set Computers) (includes related article on price and availability of the SH7032 and SH7034)"; Microprocessor Report; Jun. 21, 1993.

Farrington et al.; "A New Family Of Isolated Zero-Voltage-Switched Converters"; PESC '91 Record, 22nd Annual IEEE Power Electronics Specialists Conference, pp. 209-225, 1991.

Rozman et al.; "Circuit Considerations for Fast, Sensitive, Low-Voltage Loads in a Distributed Power System"; 1995.

Govil et al.; "Comparing Algorithms for Dynamic Speed-Setting of a Low-Power CPU"; International Computer Science Industry; Apr. 1995.

"Dallas Semiconductor"; DS1227 Kickstarter Chip White Paper.

Lokhandwala et al. "Discrete Validation of a Smart Power ASIC (SPIC) for Distributed Power System"; 35th Annual IEEE Power Electronics Specialists Conference; Aachen, Germany; 2004.

Chandrakasan et al.; "Low-Power CMOS Digital Design"; Journal of Solid-State Circuits; vol. 2; No. 4; Apr. 1992.

Nielsen et al.; "Low-Power Operation Using Self-Timed Circuits and Adaptive Scaling of the Supply Voltage"; IEEE Transactions on Very Large Scale Integration (VLSI) Systems; vol. 2; No. 4; Dec. 1994.

Fleishmann, "LongRun Power Management, Dynamic Power Management for Crusoe Processors"; Transmeta Corp.; Jan. 17, 2001.

Weiser et al.; "Scheduling for Reduced CPU Energy"; Proceedings of the First Symposium on Operating Systems Design and Implementation; Usenix Association; Nov. 1994.

M68HC05 Microcontrollers, Freescale Semiconductor, MC68HC705JJ7 Rev 4.1; Sep. 2005.

Kim et al.; "Novel High Efficiency Base Drive Using Zero Voltage Switching Converter"; PESC '91 Record, 22nd Annual IEEE Power Electronics Specialists Conference; pp. 545, 550; 1991.

Texas Instruments CMOS NOR Gates DC4001B, CD4002B, CD4025B Types; Data Sheet acquired from Harris Semiconductor SCHS015C; Aug. 2003.

Plaintiff and Counterdefendant Qualcomm Incorporated's Preliminary Invalidity Contentions for U.S. Patent Nos. 5,500,872, 5,627,412, 5,946,344, 6,075,807, 6,320,896, and 6,714,559.

Von Kaenel et al.; "A Voltage Reduction Technique for Battery-Operated Systems"; IEEE Journal of Solid State Circuits; Oct. 1990.

* cited by examiner ed device with dynamic power and performance management abilities; and, more specifically, to a battery powered device which dynamically adjusts voltage supply levels and processing speed to maximize battery life while still achieving optimum processing performance when called upon. The present invention also relates to temperature sensing control which, when necessary, overrides the power and performance management functionality to cause operation at desired temperatures.

BATTERY POWERED DEVICE WITH DYNAMIC POWER AND PERFORMANCE MANAGEMENT

The present application is a continuation of U.S. patent application Ser. No. 12/120,145, filed May 13, 2008, now U.S. Pat. No. 7,900,067, which is a continuation of U.S. patent application Ser. No. 11/152,402 (now U.S. Pat. No. 7,376,848), filed Jun. 14, 2005, which is a continuation of U.S. patent application Ser. No. 09/735,406 (now U.S. Pat. No. 6,928,559), filed Dec. 12, 2000, which is a continuation of U.S. patent application Ser. No. 08/882,990 (now abandoned), filed Jun. 26, 1997.

BACKGROUND

1. Technical Field

The present invention relates generally to a battery powered device with dynamic power and performance management abilities; and, more specifically, to a battery powered device which dynamically adjusts voltage supply levels and processing speed to maximize battery life while still achieving optimum processing performance when called upon. The present invention also relates to temperature sensing control which, when necessary, overrides the power and performance management functionality to cause operation at desired temperatures.

2. Related Art

Portable computing devices continue to provide ever increasing performance and functionality. With increases in performance, such computing devices place increased load requirements on their battery power supplies. Due to size and space concerns, however, batteries of increased size and weight, which could service the increased performance of the portable computing devices with additional capacity, are generally not a viable option for the portable computing devices.

Thus, attempts have been made to reduce battery power consumption in portable devices. For example, clocking frequencies are often reduced to reduce the energy consumption of affected circuitry. However, at reducing clocking frequencies, the performance of processing units within the portable devices is degraded. Similar techniques place the portable devices in a non-operational or idle state when usage allows for such. However, when recovering from the non-operational or idle states, noticeable delays in performance result. Further, many portable devices require a minimal level of performance at all times.

Another power conservation technique involves reducing operating supply voltages. Because operation at lower voltages tends to decrease power consumption, much of the hardware in portable devices is designed to operate at relatively lower operating supply voltage levels, typically 3.3 volts or less. Limitations on operating speeds at such lower voltage supply levels, however, generally require operation at lower clocking frequencies, thus resulting in reduced performance.

In order to achieve an increase performance in portable devices, operating frequencies must typically be increased, thereby increasing the amount of power consumed and, resultantly, the amount of heat generated. In general, for a capacitive load, the relationship between the power generated by an electronic device and the operational supply voltage and frequency is given by:

$$P = \alpha V^2 \cdot F$$

where P is the power generated, α is a constant, v is the operational voltage and F is the operational frequency. Therefore, with increased operational frequencies, it is desirable to correspondingly decrease the operational voltage in order to minimize the power consumed and the heat generated by the electronic device. However, the dichotomy of decreasing the operational voltage of an electronic device operating at high frequencies is that the switching speeds of electronic devices operating at lower voltages are slowed as a result of the lower voltages. Thus, it is difficult to obtain high frequency operation of an electronic device with simultaneous low power operation.

Thus, there lies a need for a system that optimizes the operation of a portable device to optimize performance while simultaneously working to extend battery life. Further, there lies a need for such a portable device that operates in a desired operating range so as to avoid heat related failure.

SUMMARY OF THE INVENTION

A computing device according to the present invention has a processor that operates over a range of voltages and frequencies and over a range of processor usage levels. The computing device includes at least a variable frequency generator, a variable voltage power supply and voltage supply level and clocking frequency management circuitry. The variable frequency generator is coupled to the processor and delivers a clock signal to the processor. The variable voltage power supply is coupled to the processor and delivers voltage to the processor. The voltage supply level and clocking frequency management circuitry adjust both the voltage provided by the variable voltage power supply and the frequency of the signal provided by the variable frequency generator.

The processor also operates over a range of temperatures. The computing device therefore further includes a temperature sensor that provides signals indicative of the temperature of the processor. In such construction, the voltage supply level and clocking frequency management circuitry, based on the temperature indicated by the temperature sensor, adjusts the voltage and/or the clocking frequency provided by the variable voltage power supply. The computing device may also include a fan controlled by the voltage supply level and clocking frequency management circuitry, the fan adjusting the temperature of the processor when activated. In cold weather applications, the computing device may further include a heater controlled by the voltage supply level and clocking frequency management circuitry that raises the temperature of the processor when activated.

In the computing device, the voltage supply level and clocking frequency management circuitry may further control the variable frequency generator and variable voltage power supply to adjust processing capacity of the processor. In such case, the processor may determine processing load provided by the computing device and indicate a processing load to the voltage supply level and clocking frequency management circuitry. The voltage supply level and clocking frequency management circuitry then compares processing load to processing capability and, based upon the comparison, adjusts processing capability by adjusting clocking frequency. The voltage supply level and clocking frequency management circuitry may also adjust voltage supply level to adjust processing capability.

Moreover, other aspects of the present invention will become apparent with further reference to the drawings and specification which follow.

BRIEF DESCRIPTION OF THE DRAWINGS

The numerous objects and advantages of the present invention may be better understood by those skilled in the art by reference to the accompanying figures in which.

DETAILED DESCRIPTION

Figure 1A:
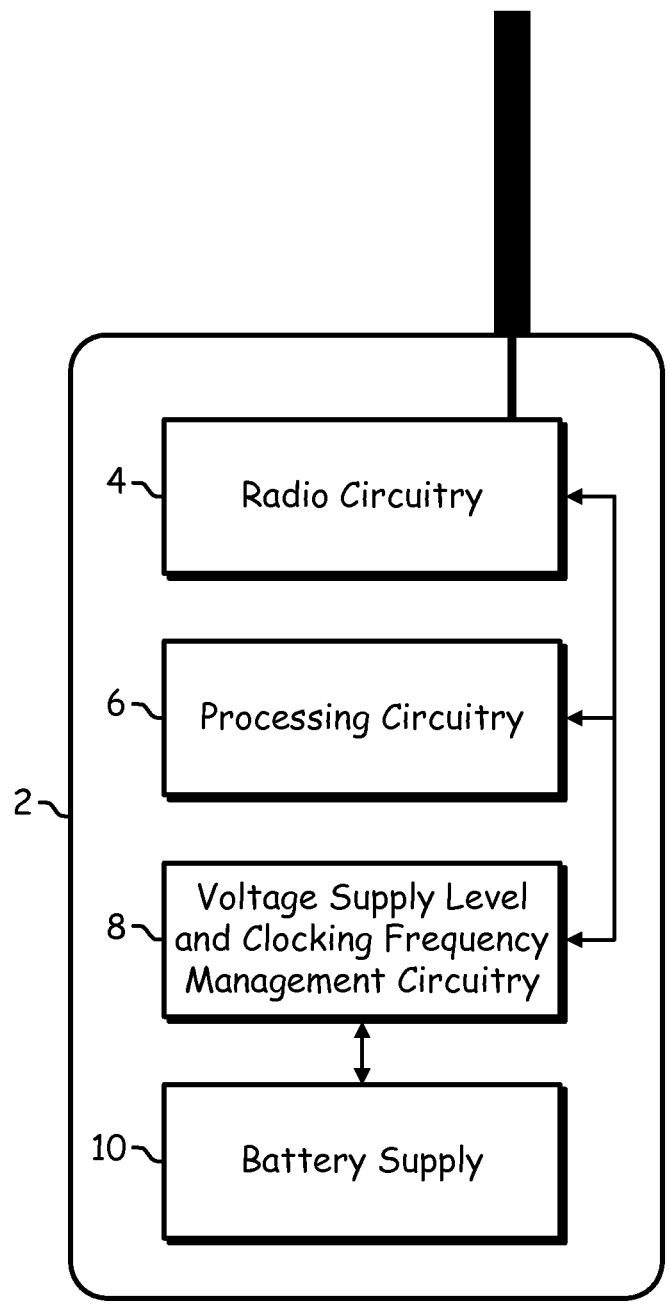
FIG. 1A is a block diagram illustrating an exemplary computing device constructed according to the present invention that is battery powered and includes voltage supply level and clocking frequency management circuitry (VSL&CF management circuitry) to optimize performance of the computing device while reducing power consumption when appropriate.

FIG. 1A illustrates an exemplary computing device 2 constructed according to the present invention. As constructed, the computing device 2 is portable, facilitates wireless communications, and may be used within a wireless communication system. The computing device includes radio circuitry 4, processing circuitry 6, voltage supply level and clocking frequency management circuitry 8 (hereinafter, the "VSL&CF management circuitry") and a battery supply 10. The radio circuitry 4 facilitates the wireless communication while the processing circuitry performs various processing tasks according to the present invention and otherwise. While, for simplicity, the radio circuitry 4 and processing circuitry 6 are illustrated as singular elements, each may include numerous components, with each component providing its own functionality. Thus, the scope of the present invention extends beyond the boundaries of those components illustrated.

The battery supply 10 provides all operating power to the computing device 2 and, of course, has a limited battery life. The VSL&CF management circuitry 8 provides the voltage supply level and clocking frequency to the radio circuitry 4 and the processing circuitry 6 at managed levels to maximize battery life while optimizing performance and heat generation. In adjusting voltage supply level and clocking frequency, the VSL&CF management circuitry 8 monitors various operating characteristics of the computing device 2 and makes operating decisions based upon the monitored operating characteristics. In optimizing heat generation, the VSL&CF management circuitry 8 monitors operating temperature as well as voltage supply level and clocking frequency and adjusts operating parameters based upon the monitored quantities.

One set of parameters which may be monitored by the VSL&CF management circuitry 8 relates to the combined power consumption of the radio circuitry 4 and the processing circuitry 6. By monitoring the voltage supply level and the current drawn, the VSL&CF management circuitry 8 may determine power consumption over time. By monitoring such power consumption, and based upon battery supply 10 characteristics and charge levels, the VSL&CF management circuitry 8 may project battery life. In projecting battery life, the VSL&CF management circuitry 8 may also monitor battery charge levels or interact with intelligent control that may be included in the battery supply 10. Once battery life has been projected, the VSL&CF management circuitry 8 may then alter voltage supply level and operating frequency to maximize battery life or to reach a desired duration of operation.

Based upon battery life projections, and an expected required duration of operation until a subsequent recharge cycle, the VSL&CF management circuitry 8 adjusts voltage supply level and clocking frequency. In one case, the VSL&CF management circuitry 8 may reduce processing capability by reducing both voltage supply level and clocking frequency provided to the processing circuitry 6 in order to extend the time over which the computer device 2 operates. Such operation may be particularly useful when minimal communication requirements must be met for an extended period via the radio circuitry 4 while processing requirements may be minimized or deferred until later time.

For example, when the computer device 2 provides both communication functions, data gathering functions and coded image decoding functions, the VSL&CF management circuitry may partially or fully disable coded image decoding functions to ensure that communication functions and data gathering functions are only immediately supported. Further, by monitoring the immediate processing requirements of the radio circuitry 4 and the processing circuitry 6, the VSL&CF management circuitry may provide a sufficient clocking frequency at sufficient voltage supply levels to facilitate required processing levels only as immediately required. In such operation, the VSL&CF management circuitry 8 may partially or fully disable components within the computer device 2 when possible to reduce power requirements.

As another example, the VSL&CF management circuitry 8 maintains voltage supply level and clocking frequency such that the processing circuitry 6 and radio circuitry 4 provide minimum required performance at all times. Being coupled to the radio circuitry 4 and the processing circuitry 6, the VSL&CF management circuitry monitors the processing requirements. Based upon the processing requirements, the VSL&CF management circuitry 8 sets the voltage supply level and clocking frequency at levels sufficient to provide the required processing levels over time. In this operation as well, the VSL&CF management circuitry 8 may partially disable components within the computer device 2 when possible to reduce power requirements.

Power management operations could be consistent with available industry standards such as the Advanced Power Management (APM) BIOS Interface Specification promulgated by Intel Corporation and Microsoft Corporation. Such standards could be modified according to the teachings of the present invention by altering the voltage supply level and/or clocking frequency to computing device components in addition to disabling operation of components according to the standards.

In still other operations, the VSL&CF management circuitry 8 monitors operating temperatures of the circuitry contained within the computer device 2. As was previously explained, as voltage supply level and operating frequency increase, heat generation also increases. Should operating temperature of the components within the computing device 2 exceed a desired operational range, the VSL&CF management circuitry 8 adjusts voltage supply levels and clocking frequency to reduce heat generation to cause operating temperature to move within an acceptable temperature range. However, since heat generation positively relates to the level of processing performed, a reduction in voltage supply level and operating frequency decreases performance as well. Thus, management relating to heat generation levels must be coordinated with processing requirements. Such coordination could include cycling operation at varying voltage supply levels and clocking frequencies to provide higher performance during higher requirement periods while providing lower performance during lower requirement periods, all while concurrently managing operating temperature.

Figure 1B:
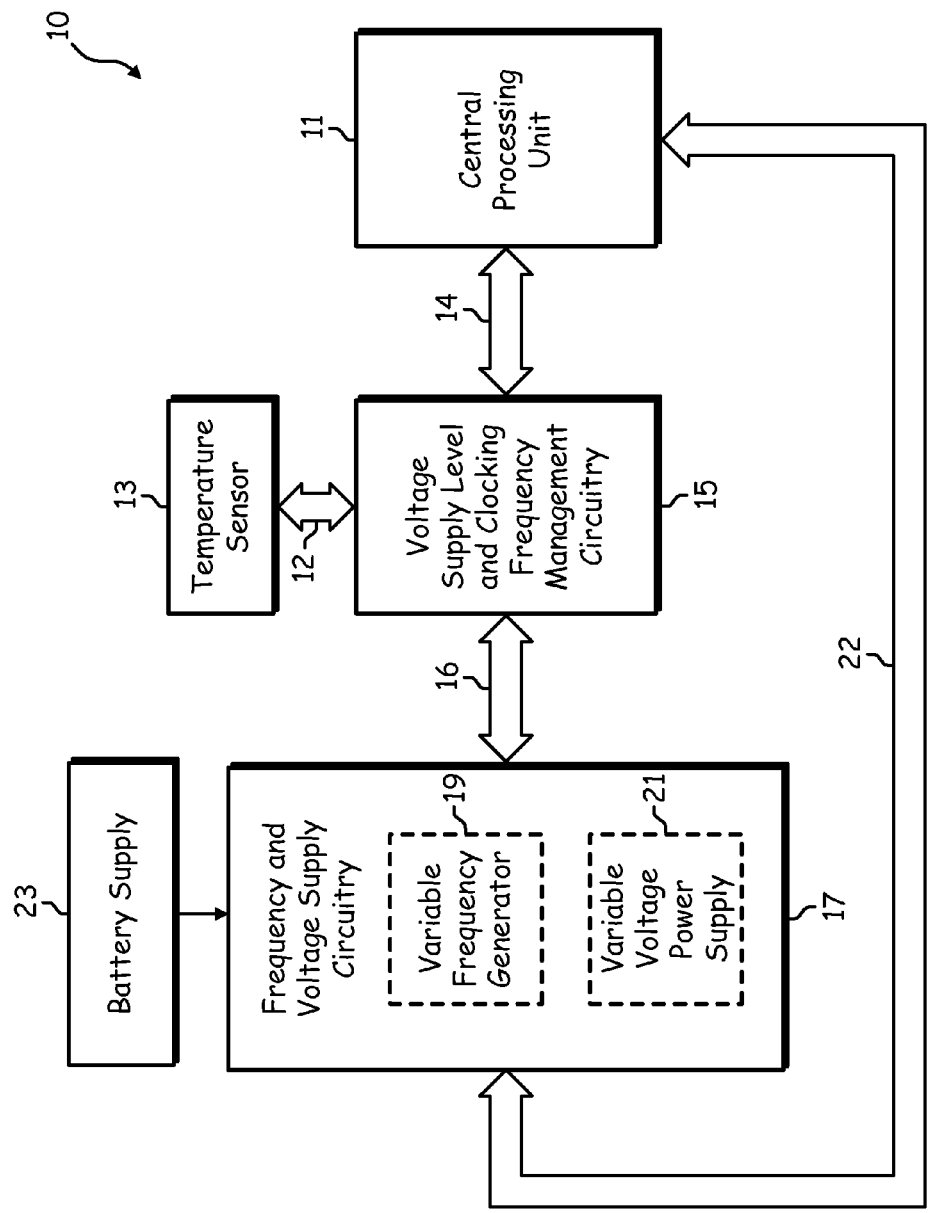
FIG. 1B is a block diagram illustrating an exemplary computing device constructed according to the present invention to operate at variable frequencies and variable supply voltages.

FIG. 1B illustrates a portion of an exemplary computing device 10 that operates at variable frequencies and variable supply voltages according to the present invention. As shown, the computing device 10 includes a central processing unit 11 (CPU), a temperature sensor 13, VSL&CF management circuitry 15, frequency and voltage supply circuitry 17 and a battery supply 23. The frequency and voltage supply circuitry 17 includes a variable frequency generator 19 and a variable voltage power supply 21, each controlled by the VSL&CF management circuitry 15. A battery supply 23 couples to the frequency and voltage supply circuitry 17 to provide a source of power. The computing device 10 may also include conventional processing circuitry, radio circuitry and other components as may be found in computing devices.

As shown, buses 12, 14, 16 and 22 provide transmission paths for the various signals and voltages passed among the components of the computing device 10. Such buses 12, 14, 16 and 22 provide routes for the voltage supply and the clocking signals. The buses 12, 14, 16 and 22 also provide transmission paths for the data, addresses and control signals required for the components to function. However, in alternate embodiments, the voltage supply and clocking signals may be provided by alternate paths.

The frequency and voltage supply circuitry 17 includes both a variable frequency generator 19 and a variable voltage power supply 21. The variable frequency generator 19 provides clocking signals to the various components of the computing device 10 via the buses 12, 14, 16 and 22. The variable voltage power supply 21 provides the supply voltage to the components of the computing device 10 via the buses 12, 14, 16 and 22. Such supply voltage, in a CMOS implementation, is typically referred to as $V_{DD}$. Such components may be constructed in known fashions or in a fashion unique to the present invention.

The variable frequency generator 19, for example, may comprise a voltage controlled oscillator coupled to a digital-to-analog converter (ADC). In such case, the digital-to-analog converter may receive the output of a multi-bit latch whose value is set and reset by the VSL&CF management circuitry 15. Based upon the value stored in the latch, the ADC produces an analog output that drives the voltage controlled oscillator to produce an output. The output is then squared and provided as a clocking signal to the CPU 11 and other connected circuitry. However, many varied other implementations may be constructed to provide the variable frequency functions of the variable frequency generator 19.

The variable voltage power supply 21 receives its input from the VSL&CF management circuitry 15 and produces a voltage supply output having a level based upon the input. The variable voltage power supply 21 may comprise a switching power supply, a voltage divider circuit or such other circuitry that may be controlled to provide a variable voltage output. In one implementation, the variable voltage power supply receives output of the battery supply directly and switches such output directly to produce a controlled output as the variable voltage power supply.

The temperature sensor 13 is used to sense the temperature of the CPU 11 and/or other circuitry contained in the processing unit 10. Alternatively, the temperature sensor 13 senses the temperature of a heat sink employed to sink all or a portion of the heat generated by connected circuitry. Based upon the temperature sensed, the temperature sensor 13 provides input to the VSL&CF management circuitry 15. In one embodiment, the temperature sensor 13 may provide a continual indication of a sensed temperature to the VSL&CF management circuitry 15. However, in another embodiment, the temperature sensor 13 may provide an indication to the VSL&CF management circuitry 15 only when a sensed temperature exceeds a threshold, falls below a threshold, exceeds a specified rate of increase or decrease or otherwise meets a boundary condition.

The described electronic circuitry and other components contained within the computing device 10 is typically designed to operate within a temperature design range. For example, most CPUs are specified to operate within the temperature design range and operation outside of such range is not guaranteed. Further, elements such as liquid crystal diodes (LCDs), only operate properly within a particular range. Thus, the VSL&CF management circuitry, in combination with the temperature sensor 13, operates both to decrease voltage power supply levels when the operating temperature of such components exceed the temperature design range and to increase voltage power supply levels when the operating temperature of such components falls below the temperature design range.

In addition to altering the voltage supply level, the VSL&CF management circuitry 15 also varies the operating frequency to alter the amount of heat produced by the electronic components. By decreasing clocking frequency, heat generation may be reduced. Additionally, by increasing clocking frequency, heat generation is increased. Typically, however, both voltage supply level and clocking frequency are varied to alter adjust heat generation levels.

In adjusting supply voltage and clocking frequency, operating temperature is affected. However, the components illustrated in FIG. 1B (and in subsequent diagrams) display hysteresis in their response due to heat generation and flow characteristics. Thus, when particular action is taken in response to input from the temperature sensor 13, no additional action is taken for a time period. Such delay allows the components of the computing device 10 time to respond. Additional action may be taken, if necessary, only after a hysteresis time-period has expired.

Figure 2A:
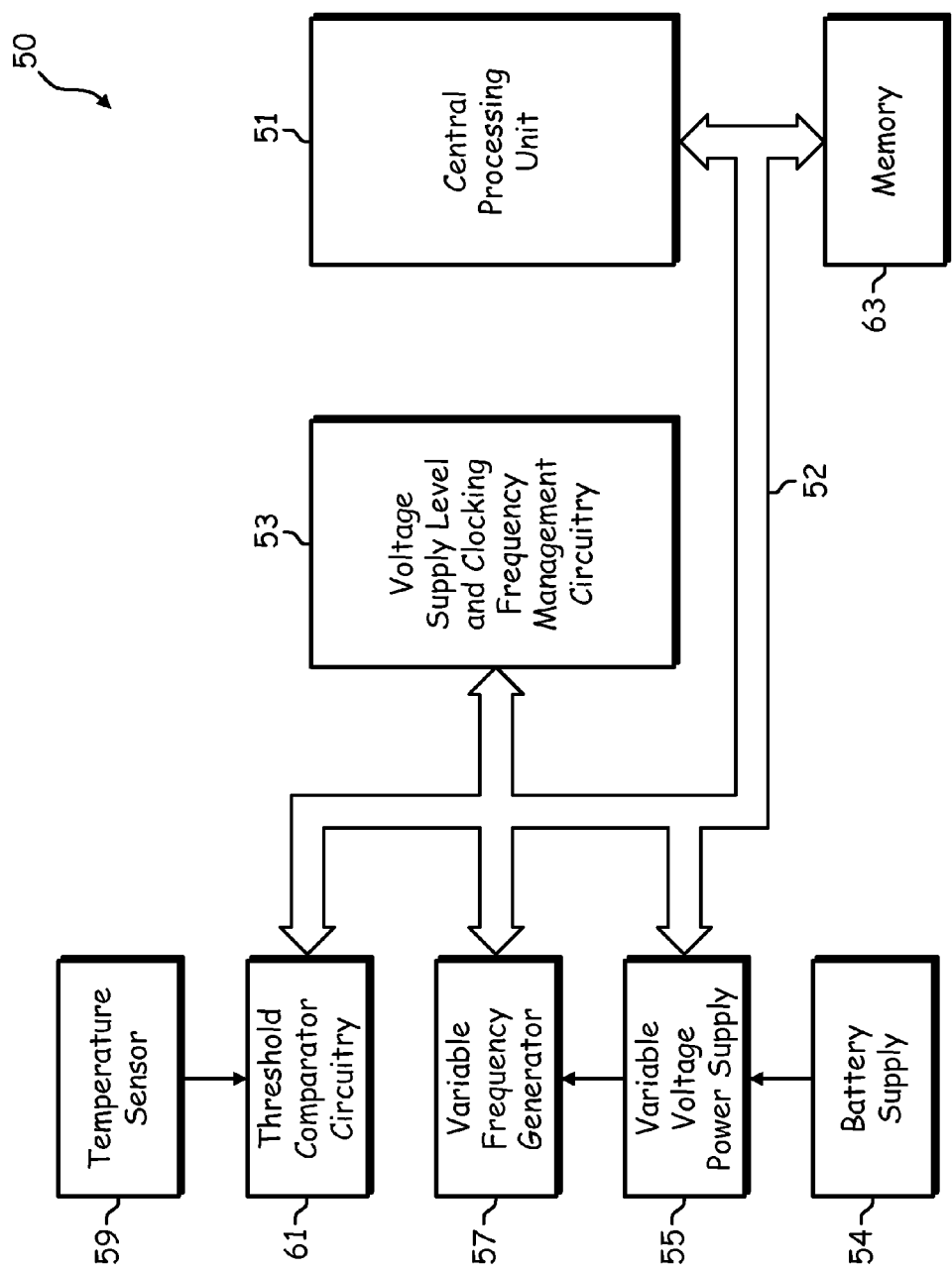
FIG. 2A is a block diagram illustrating an alternate computing device constructed according to the present invention including VSL&CF management circuitry that varies operating frequency and supply voltage to control loading and temperature generation.

FIG. 2A illustrates an alternate computing device 50 constructed according to the present invention including load monitoring and control circuitry 53 (VSL&CF management circuitry) that varies operating frequency and supply voltage to control loading and temperature generation. Construction of the computing device 50 differs slightly from the construction of the computing device 10 illustrated in FIG. 1B.

The computing device 50 includes a single bus 52 that couples to each of the components of the computing device 50 except for a battery supply 54. A memory 63 couple to the components of the computing device 50 via the bus 52. The battery supply 54 couples to the variable voltage power supply 55 which, in turn, couples power to the variable frequency generator 57. The VSL&CF management circuitry 53 receives input from a temperature sensor 59 via threshold comparator circuitry 61 and the bus 52. As compared to the construction of FIG. 1B, the threshold comparator circuitry 61 issues signals to the VSL&CF management circuitry 53 only when thresholds are exceeded. In operation, thresholds are exceeded when the temperature of monitored components of the computing device 50 exceeds an upper threshold or goes below a lower threshold.

During normal operation, VSL&CF management circuitry 53 monitors operation of the CPU 51 to determine the processing load placed upon the CPU 51. While monitoring the processing load, the VSL&CF management circuitry 53 then projects future processing requirements. Processing load may be determined via routines built into the CPU 51 or may be inferred from bus 52 activity. Should the clocking frequency be sufficient to handle future processing requirements, the VSL&CF management circuitry 53 continues operation at the current clocking frequency. However, should the clocking frequency exceed the level required to meet future processing requirements, the load management circuitry 53 directs the variable frequency generator to lower the clocking frequency. Moreover, should the clocking frequency be insufficient to meet future processing requirements, the load management circuitry 53, the load management circuitry 53 directs the variable frequency generator 57 to lower operating frequency to conserve battery life.

Based upon input from the temperature sensor 59, the VSL&CF management circuitry 53 adjusts the voltage supply level to alter temperature of the components within the computing device 50. If the VSL&CF management circuitry 53 determines that the operating temperature must be raised so that the CPU 51 operates within a specified range, for example, the VSL&CF management circuitry sends an appropriate message to the variable voltage power supply 55. In response, the variable voltage power supply increases the voltage supplied to the CPU 51 (and other components connected to the bus 52). During such operation, the variable frequency generator 57 output may also be altered to vary the frequency of the clock input supplied to the CPU 51. Specifically, if the temperature of the CPU 51 resides above a specified range, and the voltage being supplied to the CPU 51 is at a high end of the operating range, the clocking frequency is lowered. Thus, the CPU 51 produces less heat energy and, resultantly, temperature of the CPU 51 is lowered over time.

Figure 2B:
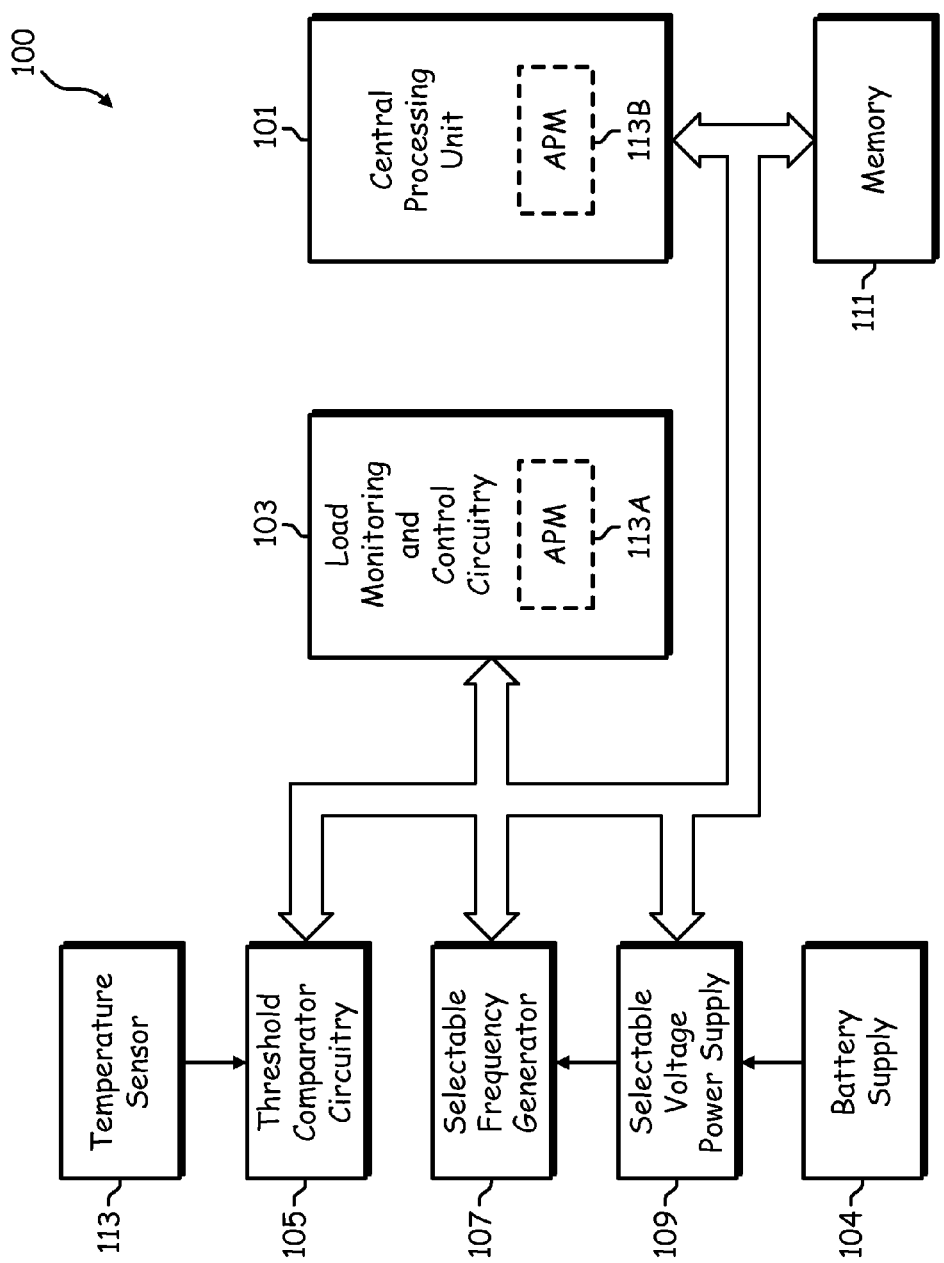
FIG. 2B is a block diagram illustrating another alternate computing device constructed according to the present invention and having a selectable frequency generator and a selectable supply voltage to account for loading and operating temperature.

FIG. 2B illustrates another computing device 100 constructed according to the present invention having a selectable frequency generator 107 and a selectable supply voltage 109 to account for loading and operating temperature. In addition, the computing device 100 includes a CPU 101, VSL&CF management circuitry 103, a temperature sensor 113, threshold comparator circuitry 105, a battery supply 104 and memory 111.

The computing device is constructed similarly to the computing device 50 illustrated in FIG. 2A but, as opposed to the variable frequency generator 57 and variable voltage power supply 55, the computing device 100 includes the selectable frequency generator 107 and the selectable voltage power supply 109. Not fully variable across an entire range as the variable frequency generator 57 of FIG. 2A, the selectable frequency generator 107 provides clock frequencies at 20, 40, 60 and 80 MHz. Further, the selectable voltage power supply 109 provides voltages at 2.5, 3.3 and 5.0 volts and is not fully variable across an operating range. Thus, as compared to the construction of FIG. 2A, these devices are stepwise adjustable.

In an exemplary operation, the threshold comparator circuitry 105 via input from the temperature sensor 113 senses that the temperature of the CPU 101 exceeds the upper end of the allowable temperature range and indicates such to the VSL&CF management circuitry 103. At such time, the selectable frequency generator 107 is clocking the CPU 101 at 80 MHz to provide maximum performance while the supply voltage is being provided by the selectable voltage power supply 109 at 5.0 volts. Through investigation, the VSL&CF management circuitry 103 determines that the current performance level must be maintained. Thus, the VSL&CF management circuitry 103 commands the selectable voltage supply 109 to produce a 3.3 volt supply voltage. If the selectable voltage power supply 109 is already at 3.3 volts, the VSL&CF management circuitry 103 sends directs the selectable frequency generator 107 to reduce operating frequency from 80 MHz to 60 MHz.

In a similar example with the same operating point, the VSL&CF management circuitry 103 determines that the CPU 101 does not require the current level of performance. Thus, the VSL&CF management circuitry 103 directs the selectable frequency generator 107 to reduce clocking frequency to 60 MHz. Thus, depending upon various operating conditions, frequency of operation and supply voltage levels may be adjusted differently.

Figure 2C:
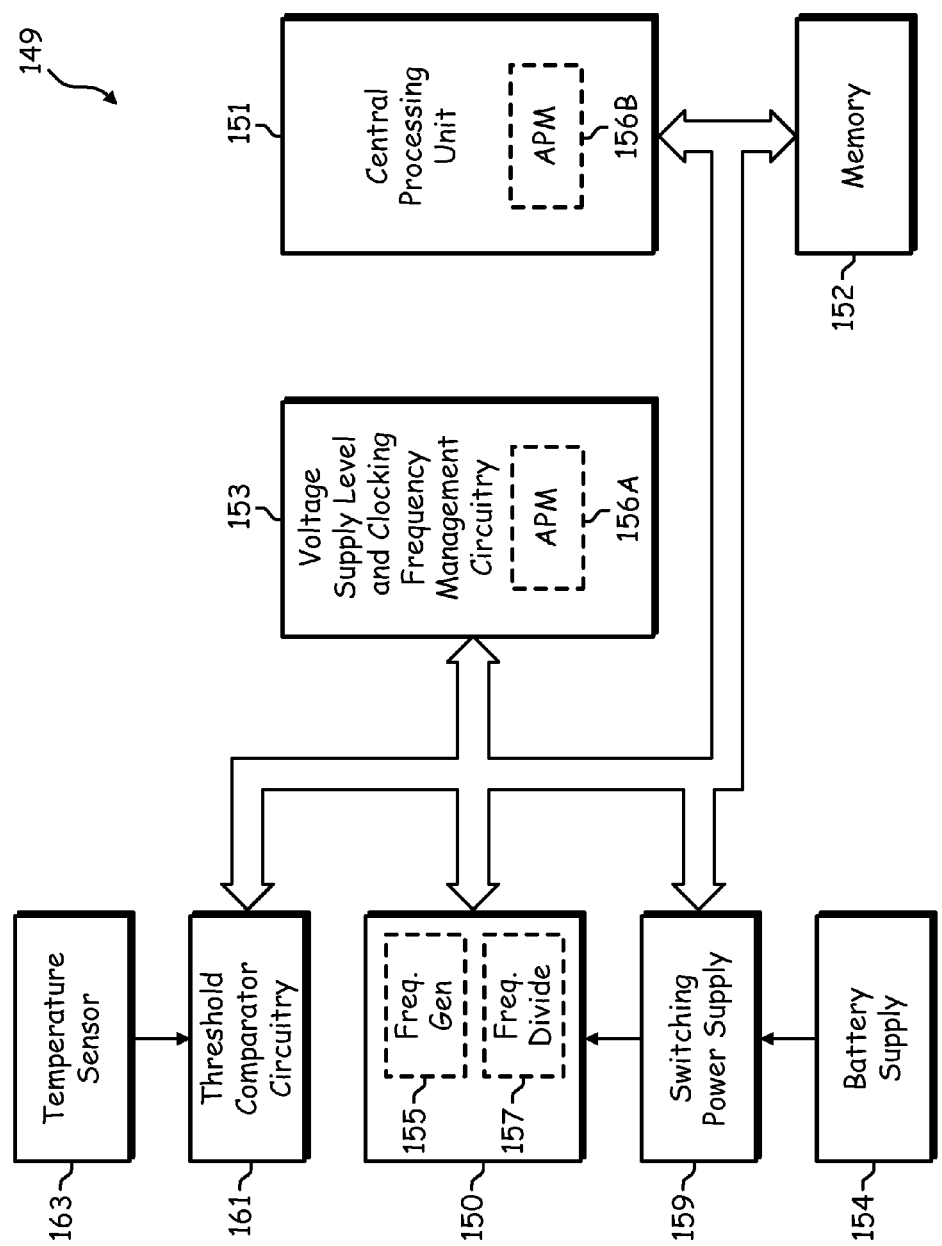
FIG. 2C is a block diagram illustrating still another alternate computing device constructed according to the present invention having a voltage controlled frequency generator producing a frequency and divided by a frequency divider to produce an operating frequency and a switching power supply, such elements controlled by load VSL&CF management circuitry to adjust power consumption and heat generation of the controlled circuitry.

FIG. 2C illustrates still another computing device 149 constructed according to the present invention with differing construction. The computing device 149 includes a CPU 151, memory 152, VSL&CF management circuitry 153, frequency generation circuitry 150, a switching power supply 159 connected to a battery 154 that provides a voltage power supply, a temperature sensor 163 and threshold comparator circuitry 161. As compared to previously described embodiments, the computing device 149 operates similarly to control frequency of operation and voltage power supply levels but accomplishes such operations in a different fashion.

The frequency generation circuitry 150 includes a voltage controlled frequency generator 155 and a frequency divider 157. The VSL&CF management circuitry 153 provides a control input to the frequency generation circuitry 150 to control operation of the frequency generator 155 and the frequency divider 157. Based the control input, the frequency generation circuitry 150 provides a control voltage to the frequency generator 155 which produces an oscillating output based upon the control voltage. Then, based the control input from the VSL&CF management circuitry 153, the frequency divider 157 divides the output from the frequency generator 155 to produce an oscillating output that is provided to the CPU 151 and other components of the computing device 149.

The VSL&CF management circuitry 153 also controls an output produced by the switching power supply 159. Based upon the control, the switching power supply 159 produces a voltage supply to the other components of the computing device 149. The VSL&CF management circuitry 163 receives input from the threshold comparator circuitry 161 which, in turn, receives input from the temperature sensor 163 indicating temperature of one or more components of the computing device 149. When the threshold comparator circuitry 161 determines that the sensed temperature exceeds a threshold, it indicates such to the VSL&CF management circuitry 153. In response thereto, the VSL&CF management circuitry 153 may alter operation of the frequency generation circuitry 150 and/or the switching power supply 159.

As indicated, the computing device 149 may include Advanced Power Management (APM) functionality in either the VSL&CF management circuitry 153 or the CPU 151, referenced as 156A and 156B, respectively. Such APM functionality allows the computing device 149 to execute power management functions consistent with corresponding standards. Thus, in such case, the computing device 149 may take advantage of those features built into the various installed components to further manage the power consumption (and heat generation) of the managed components.

Figure 3:
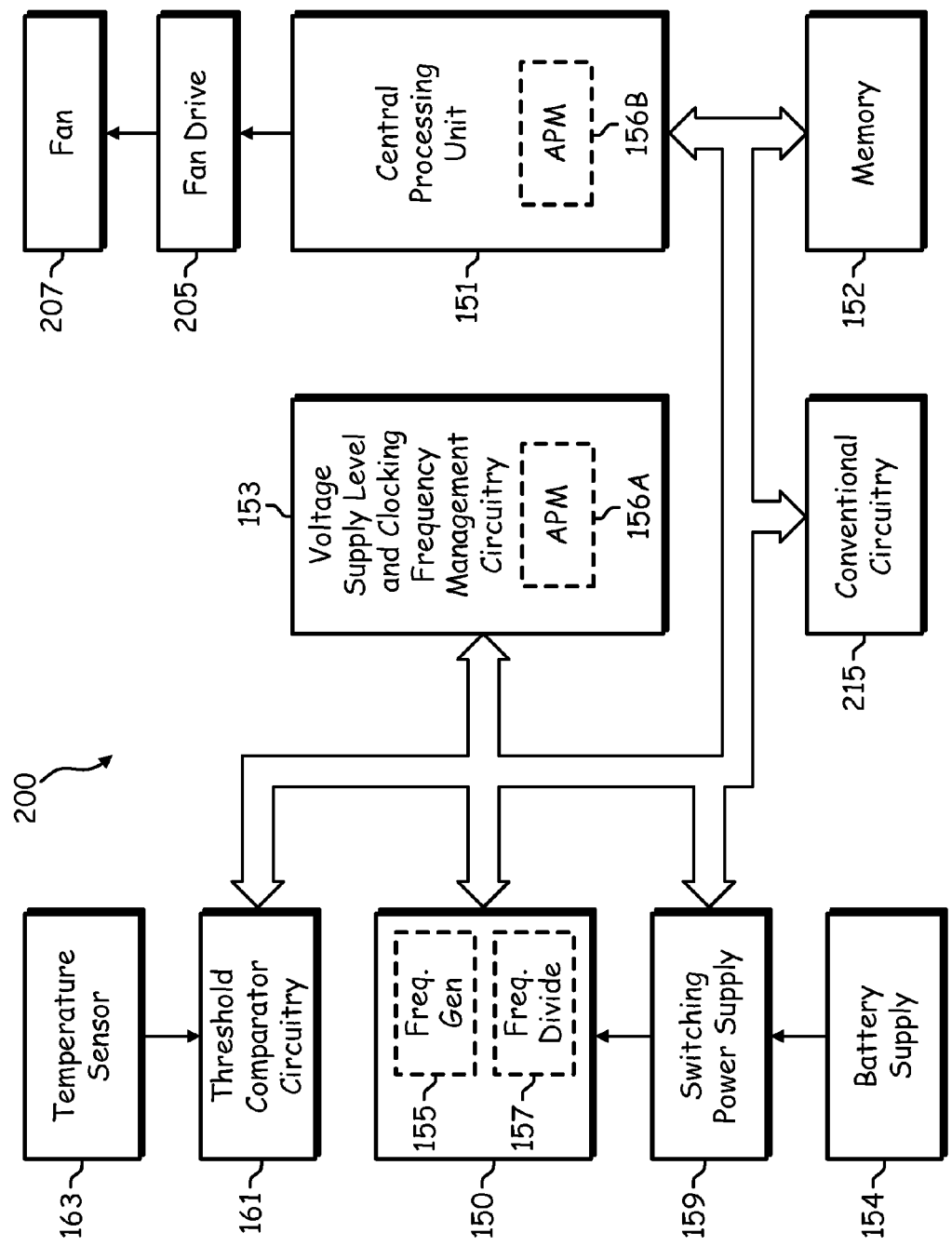
FIG. 3 is a block diagram illustrating a computing device constructed according to the present invention including a fan and fan drive circuitry operable in conjunction with a variable frequency generator and a switching power supply to manage power consumption and temperature generation of a processor, radio circuitry and other conventional circuitry.

FIG. 3 illustrates a computing device 200 constructed similarly to the computing device 149 illustrated in FIG. 2C. Common components share common numbering and are not described further herein with reference to FIG. 2C. The computing device 200 further includes conventional circuitry 215, a fan drive 205 and a fan 207.

The conventional circuitry 215 may include various components found in computing devices, such circuitry including interface circuitry, displays, input circuitry, storage devices or other conventional circuitry. The conventional circuitry 215 receives a voltage supply from the switching power supply 159 and clocking signals from the frequency generation circuitry 150. Thus, the VSL&CF management circuitry 153 also controls operation of the conventional circuitry 215.

The fan drive 215, which is controlled by the CPU 151, powers the fan 207. When operating, the fan 207 removes heat from the computing device 200 to cool components within the computing device 200. Alternately, the fan 207 could be coupled with a heating coil to warm the components of the computing device 200 when warming is required during operation in low ambient temperatures. In an alternate construction, the fan drive 205 could be connected to, and controlled by, the VSL&CF management circuitry 153.

In an exemplary operation, the VSL&CF management circuitry 153 controls the fan 207 to operate in conjunction with the frequency generation circuitry 150 and the switching power supply 159. When operating temperatures are low, i.e. below a desired temperature range, the fan 207 need not be operated unless in conjunction with heating coils to warm circuitry contained in the computing device 200. In many cases, operating temperature may be controlled substantially by controlling voltage supply levels and operating frequencies. However, when operating temperatures move past the upper limit of a desired temperature range, even with control of voltage supply level and frequency, the CPU 151 turns on the fan 207 via the fan drive 205. The CPU 151 then directs the fan drive 205 to turn off the fan 207 when the operating temperature falls below a threshold, considering temperature hysteresis.

Figure 4:
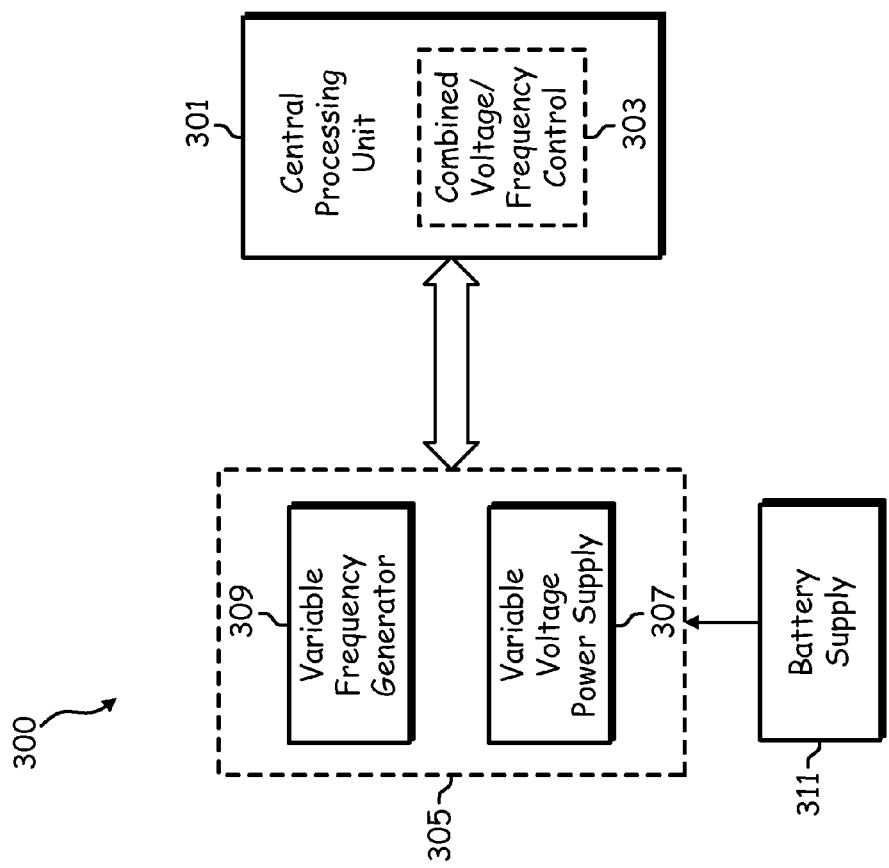
FIG. 4 is a block diagram illustrating a computing device constructed according to the present invention in which combined power saving voltage control and frequency control are accomplished by a central processing unit executing instructions therefore.

FIG. 4 illustrates a computing device 300 constructed according to the present invention in which combined power saving voltage control and frequency control are accomplished by a CPU 301 programmed therefore. The computing device 300 includes the CPU 301, VSL&CF management circuitry 305 in communication therewith and a battery supply 311. As contrasted to previously described embodiments, functions relating to the adjustment of operating voltage supply levels and operating frequencies are performed primarily by the CPU 301. The CPU 301 thus executes instructions 303 relating to combined power saving voltage and frequency control. The CPU 301 provides control to the VSL&CF management circuitry 305 which includes a variable frequency generator 309 and a variable voltage power supply 307, both of which receive power from the battery supply 311.

Figure 5:
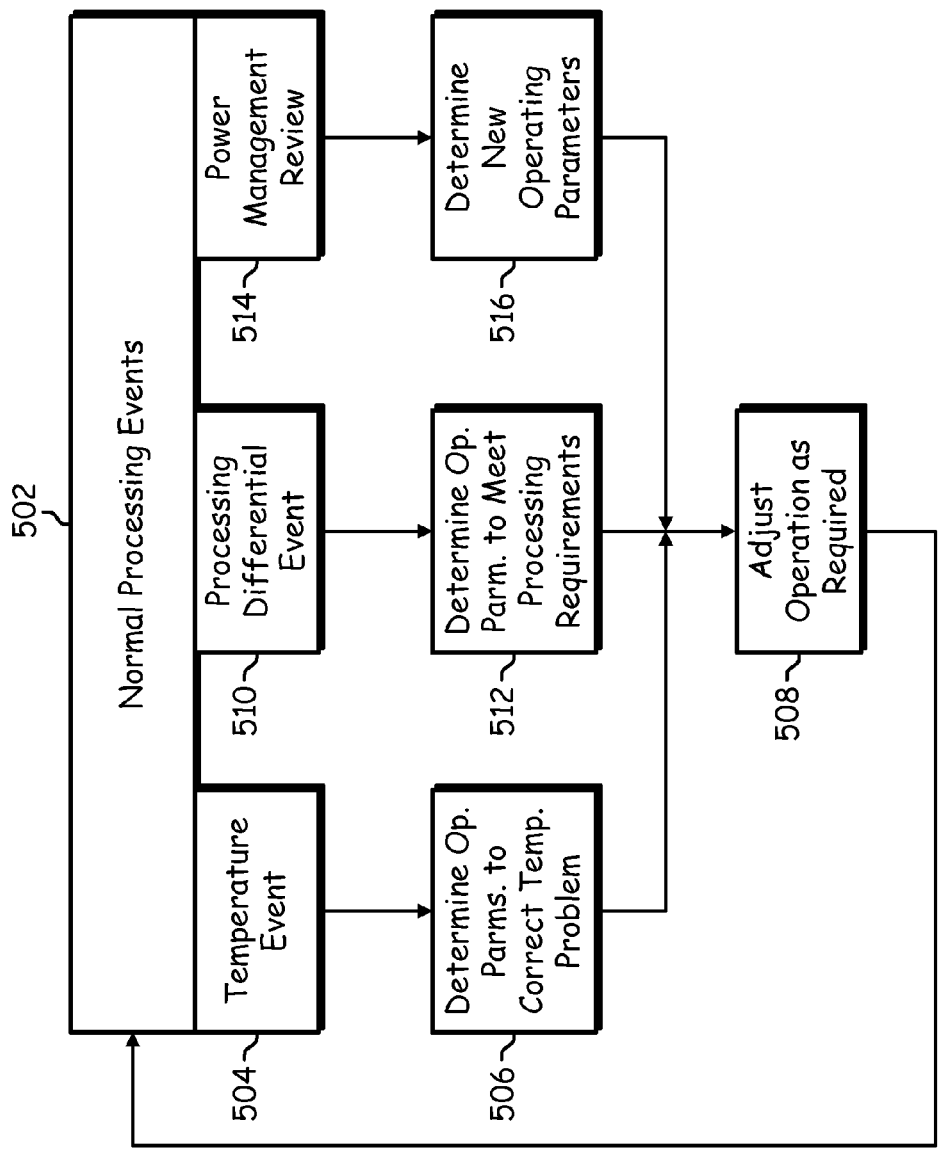
FIG. 5 is a flow diagram illustrating operation of a computing device constructed according to the present invention in which the computing device operates to reduce power consumption and heat generation while providing processing capacity sufficient to satisfy processing demands.

FIG. 5 illustrates steps accomplished in the operation of a computing device constructed according to the present invention during which the computing device operates to reduce power consumption, maintain operating temperature within a desired range and provide sufficient processing capability to meet processing requirements. Operation commences at step 502 wherein the computing device performs ongoing normal processing operations. Such normal processing may include, for example, data acquisition, data processing, providing wireless communications, interfacing with a user and other processing functions.

Upon occurrence of a temperature event, operation transitions to step 504. Temperature events include those operating conditions wherein operating temperature of the computing device has extended beyond a desired range. Such event may also be coupled with a hysteresis period as will further be described herein. As an example, a temperature event may occur when the temperature sensor 13 of FIG. 1B determines that the operating temperature of the CPU 11 has resided above an upper temperature limit of a desired operating temperature range for a period of time sufficient to require intervention. Alternately, a temperature event could be triggered when it appears that the operating temperature will move outside of desired range such that immediate intervention will prevent the operating temperature from extending beyond an upper or lower limit of the desired operating temperature range. Still other temperature events could occur when the rate of change of operating temperature exceeds a threshold.

Upon determination of a temperature event at 504, the VSL&CF management circuitry 17 and/or the CPU 11 determines at step 506 which operating parameters should be adjusted to correct the operating temperature. For example, it may be determined that the voltage supply level should be increased to raise operating temperature or that the voltage supply level should be decreased to lower the operating temperature. Alternately, the VSL&CF management circuitry may determine that the clocking frequency should be altered or that the fan should be operated to correct the condition. Once making such determination, operation proceeds to step 508 wherein the operation of the computing device is adjusted in accordance with the determination made at step 506. From step 508, operation proceeds to step 502 wherein normal processing continues.

At step 510, the VSL&CF management circuitry determines that a processing differential event has occurred. Generally, a processing differential event occurs when the processing load placed on the computing device is disparate with the processing capability of the computing device. Such processing differential event may be triggered by the CPU when its observable load moves above an upper limit or below a lower limit. Such upper limit and lower limit may have been previously determined based upon the voltage supply level and clocking frequency previously set. A processing differential event may also occur when backlog events, such as a communication or processing backlog events, are detected. In any case, such determination indicates that the current processing levels provided by the computing device should be altered does not correspond to immediate load requirements and should be altered.

Thus, at step 512, the VSL&CF management circuitry determines how to vary operating parameters to meet the new processing requirements. For example, when current processing capability is insufficient to meet processing demands, the VSL&CF management circuitry may increase operating frequency and voltage supply levels as required to increase processing capability. In such case, the VSL&CF management circuitry may also operate the fan to remove heat from the computing device. When current processing capability exceeds processing requirements, the VSL&CF management circuitry may reduce operating frequency and adjusts voltage supply levels as appropriate. Once such adjustments are determined, the VSL&CF management circuitry adjusts operation at step 508. From step 508, operation then returns to step 502 wherein normal processing continues.

The VSL&CF management circuitry also monitors power consumption and battery supply level in an attempt to extend operating period to a maximum duration or to meet a desired point in time. Such point in time may be preset by a user consistent with the time at which the user may swap battery supplies or dock the computing device to auxiliary power. Such power management review may be performed periodically or when processing levels allow. However, normal processing events may be interrupted and operating conditions evaluated and adjusted when power consumption levels exceed a threshold or when the change in power consumption exceeds a threshold. When power management review indicates that adjustment of operating conditions is appropriate operation proceeds to step 514 and then to step 516 wherein new operating parameters are determined. From step 516, operation proceeds to step 508 wherein operation is adjusted according to the parameters determined and then again to step 502.

Each of the steps illustrated in FIG. 5 may be over ridden by user input. In such cases, normal processing may continue until manual intervention requires adjustment by a user. However, in operation wherein automatic adjustments are over ridden, the VSL&CF management circuitry may provide information and warnings to a user indicating when and how operation should be altered. Further, as a safeguard to prevent damage to the computing device that may be caused by overheating, the fan 207 may be automatically activated to prevent damaging the components of the computing device.

Figure 6:
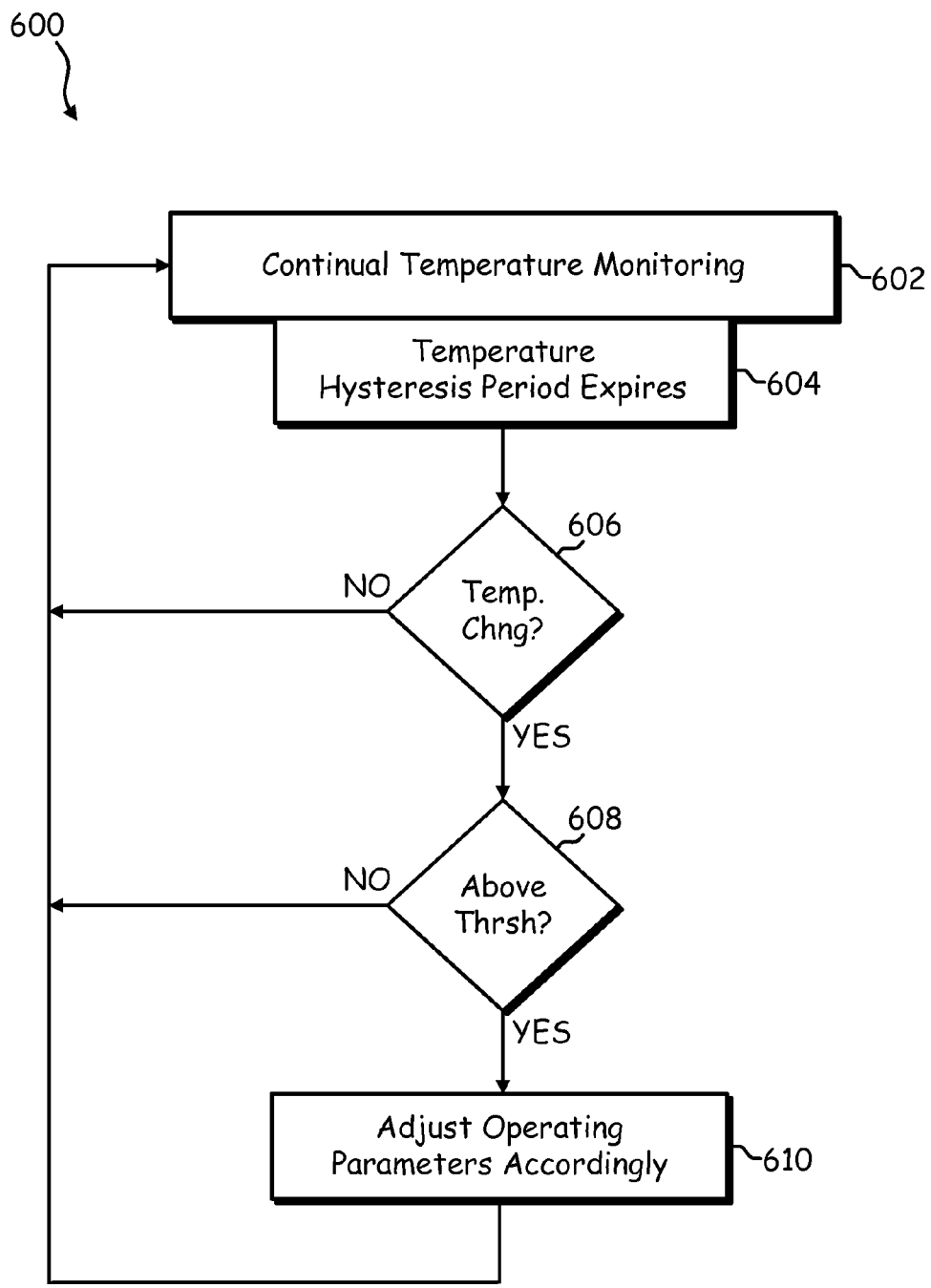
FIG. 6 is a flow diagram illustrating operation of a computing device constructed according to the present invention in monitoring operating temperature and in adjusting voltage supply level and/or frequency of operation to adjust operating temperature levels when appropriate.

FIG. 6 illustrates operation of a computing device constructed according to the present invention in monitoring operating temperature and in adjusting voltage supply level and/or frequency of operation to compensate for operating temperature levels when appropriate. Steps illustrated in FIG. 6 corresponds to operation described with reference to steps 504, 506 and 508 of FIG. 6, but with particularity.

Continual temperature monitoring at step 602 occurs during normal processing events such as those described with reference to step 502 of FIG. 5. Such temperature monitoring may be accomplished by receiving data from the temperature sensor 13 of FIG. 1B, for example, and processing such data. Data may be processed first and then compared to desired parameter ranges, compared directly to desired parameter ranges or otherwise be examined to determine whether action is required. However, not until a temperature hysteresis period expires at step 604 will any operational changes be considered. Because time periods associated with changes in temperature are substantially longer than the frequency of operation of the circuitry of the computing device, the affect upon operating temperatures of any change in operating conditions will not produce results observable by the temperature sensor for a hysteresis period. Thus, additional adjustments are not performed based upon temperature data until after expiration of the temperature hysteresis period.

When the temperature hysteresis period expires at step 604, operation proceeds to step 606 wherein it is determined whether the temperature has changed since the last adjustment period. If the temperature has not changed, operation proceeds again to step 602. However, if the operating temperature has changed at step 606 it is next determined whether the changed temperature is above a threshold level at step 608. If at step 608 it is determined that the temperature is not above the threshold level, operation proceeds to step 602. However, if it is determined that the temperature is above a threshold, operation proceeds to step 610 wherein operating parameters are adjusted. Such alteration may include altering voltage supply level, operating frequency and, perhaps, turning on the fan. From step 610, operation proceeds to step 602. Further, if at step 608 it is determined that the temperature is not above the threshold, operation also proceeds to step 602.

Figure 7:
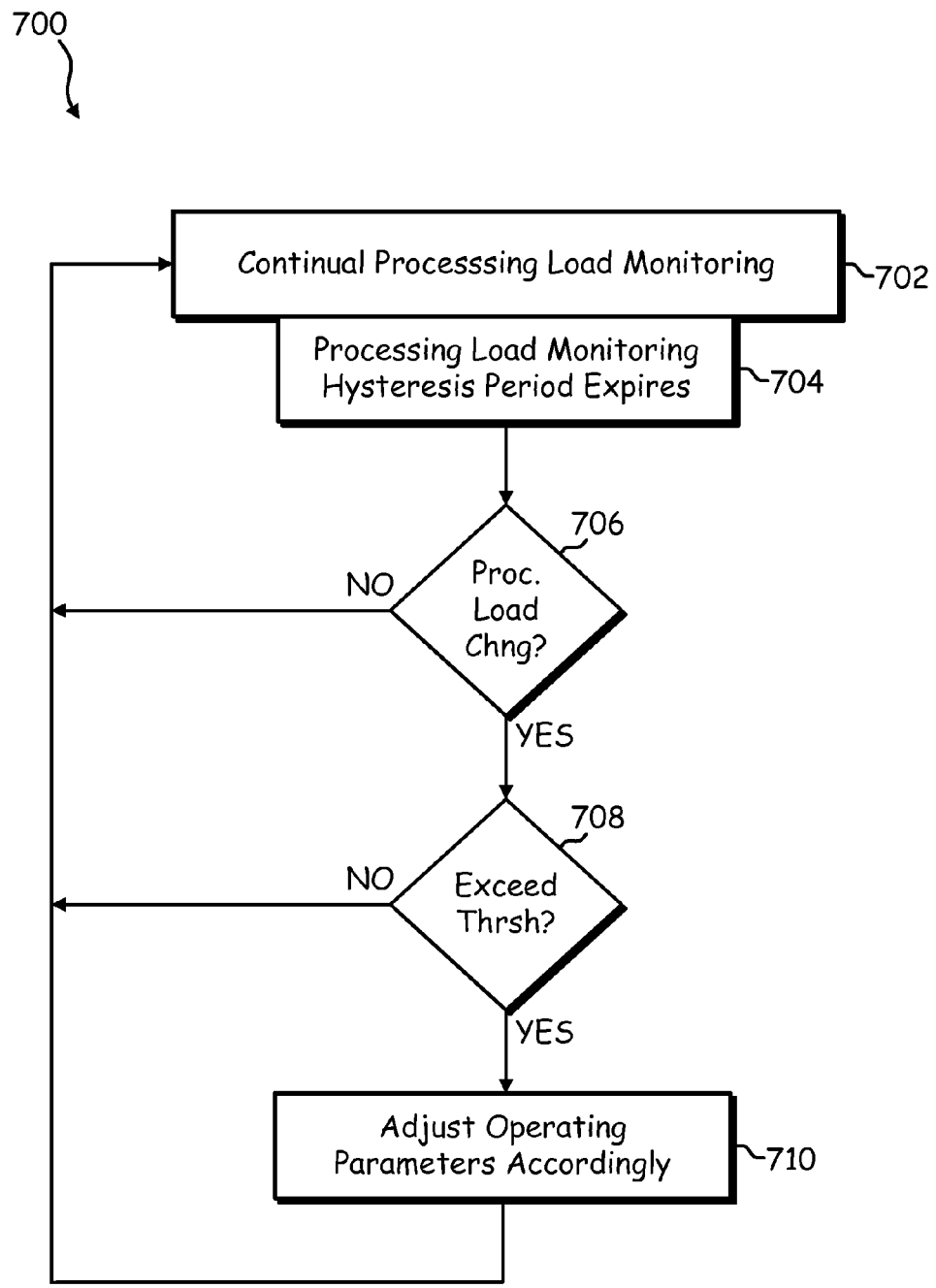
FIG. 7 is a flow diagram illustrating operation of a computing device constructed according to the present invention in monitoring processing load and in adjusting voltage supply level and/or frequency of operation to adjust processing capabilities to comply therewith.

FIG. 7 is a flow diagram illustrating operation of a computing device constructed according to the present invention in monitoring processing load and in adjusting voltage supply level and/or frequency of operation to adjust processing capability to meet such processing load. At block 702 the CPU and/or VSL&CF continually monitors the processing load placed upon the computing device. When the processing load exceeds a threshold and a hysteresis period has expired, operation proceeds to step 704. Since processing load may be examined via determining backlogged operations and prior steps may have been taken to remove such backlog, the computing device must wait until the hysteresis period expires until potentially taking action to adjust the processing capability of the computing device.

However, when conditions have been satisfied to enter step 704, operation proceeds to step 706 wherein it is determined whether the processing load has changed since the last determination. If it has not, operation proceeds again to step 702. However, if processing load has changed operation proceeds to step 708 where it is determined whether the processing load (or change in processing load) exceeds a threshold. If it does not, operation proceeds again to step 702. However, if it does, operating parameters are adjusted at step 710 to adjust the operating capacity of the computing device. As was previously discussed, when processing capacity is too low, clocking frequency and operating supply voltage is increased. However, when processing capacity is too high, clocking frequency and operating supply voltage are lowered to decrease processing capacity. From step 710, operation proceeds to step 702.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

The invention claimed is:

1. A computing device operable to function in a plurality of operating states, at least two operating states within the plurality of operating states requiring different processing loads and consuming different amounts of energy, the computing device comprising:

a processor that is operable at a plurality of voltages and at a plurality of frequencies to perform a plurality of control functions of the computing device;

a variable frequency generator, communicatively coupled to the processor, that is operable to provide at least one clock signal at one of the plurality of frequencies;

a variable power supply, communicatively coupled to the processor, that is operable to provide at least one voltage supply at one of the plurality of voltages; and power management circuitry that is communicatively coupled to the variable frequency generator and to the variable power supply, wherein the power management circuitry is operable to select an operating voltage from the plurality of voltages and select an operating frequency from the plurality of frequencies, and wherein the power management circuitry operates dynamically to detect one or more operating characteristics of the plurality of operating states and to select the operating voltage and the operating frequency to disable selected control functions of the computing device in response to the detected operating characteristics.

2. The computing device of claim 1, wherein the variable power supply is communicatively coupled to radio circuitry, which is operable to facilitate wireless communications.

3. The computing device of claim 1, wherein one or more operating characteristics comprises a processing requirement of radio circuitry.

4. The computing device of claim 3, wherein the management circuitry selects, from the plurality of voltages, a supply voltage that is sufficient to facilitate required processing levels as immediately required.

5. The computing device of claim 3, wherein the power management circuitry disables a supply voltage to the radio circuitry if radio circuitry processing is not required for an extended period of time.

6. The computing device of claim 1, wherein the computing device is operable to perform one or more of: a communication function, a data gathering function or a coded image decoding function.

7. The computing device of claim 6, wherein the power management circuitry is operable to select the operating voltage and the operating frequency to selectively disable one or more of: a communication function, a data gathering function or a coded image decoding function, in order to ensure that the other of the communication function, a data gathering function and the coded image decoding function are supported.

8. The computing device of claim 1, wherein the one or more operating characteristics comprises a temperature measurement.

9. The computing device of claim 1, wherein the one or more operating characteristics comprises a battery charge level.

10. The computing device of claim 1, wherein the power management circuitry is operable to prioritize the one or more operating characteristics.

11. A computing device operable to function in a plurality of operating states, at least two operating states within the plurality of operating states requiring different processing loads and consuming different amounts of energy, the computing device comprising:

a processor that is operable at a plurality of voltages and at a plurality of frequencies;

a variable frequency generator, communicatively coupled to the processor, that is operable to provide at least one clock signal at one of the plurality of frequencies;

a variable power supply, communicatively coupled to the processor, that is operable to provide at least one voltage supply at one of the plurality of voltages; and power management circuitry that is communicatively coupled to the variable frequency generator and to the variable power supply, wherein the power management circuitry is operable to select an operating voltage from the plurality of voltages and select an operating frequency from the plurality of frequencies, and wherein the power management circuitry operates to provide a minimum required performance at all times and to dynamically select both the operating voltage and the operating frequency to provide higher performance during higher requirement periods and lower performance during lower requirement periods while concurrently maintaining one or more operating characteristics of the plurality of operating states.

12. The computing device of claim 11, wherein the variable power supply is communicatively coupled to radio circuitry, which is operable to facilitate wireless communications.

13. The computing device of claim 11, wherein one or more operating characteristics comprises a processing requirement of radio circuitry.

14. The computing device of claim 13, wherein the power management circuitry selects, from the plurality of voltages, a supply voltage that is sufficient to facilitate required processing levels as immediately required.

15. The computing device of claim 13, wherein the power management circuitry disables a supply voltage to the radio circuitry if radio circuitry processing is not required for an extended period of time.

16. The computing device of claim 11, wherein the computing device is operable to perform one or more of: a communication function, a data gathering function or a coded image decoding function.

17. The computing device of claim 16, wherein the power management circuitry is operable to disable one or more of: a communication function, a data gathering function or a coded image decoding function.

18. The computing device of claim 11, wherein the one or more operating characteristics comprises a temperature measurement.

19. The computing device of claim 11, wherein the one or more operating characteristics comprises a battery charge level.

20. A computing device operable to function in a plurality of operating states, at least two operating states within the plurality of operating states requiring different processing loads and consuming different amounts of energy, the computing device comprising:

a processor that is operable at a plurality of voltages and at a plurality of frequencies;

a variable frequency generator, communicatively coupled to the processor, that is operable to provide at least one clock signal at one of the plurality of frequencies;

a variable power supply, communicatively coupled to the processor, that is operable to provide at least one voltage supply at one of the plurality of voltages; and power management circuitry that is communicatively coupled to the variable frequency generator and to the variable power supply, wherein the power management circuitry is operable to select an operating voltage from the plurality of voltages and to select an operating frequency from the plurality of frequencies, and wherein the power management circuitry is operable to select one or both of the operating voltage and the operating frequency to prioritize one of required processing level, power dissipation and operating temperature, the priority being determined by the power management circuitry based on one or more operating characteristics of the plurality of operating states.

21. The computing device of claim 20, wherein the variable power supply is communicatively coupled to radio circuitry, which is operable to facilitate wireless communications.

22. The computing device of claim 20, wherein one or more operating characteristics comprises a processing requirement of radio circuitry.

23. The computing device of claim 22, wherein the management circuitry selects, from the plurality of voltages, a supply voltage that is sufficient to facilitate required processing levels as immediately required.

24. The computing device of claim 22, wherein the management circuitry disables a supply voltage to the radio circuitry if radio circuitry processing is not required for an extended period of time.

25. The computing device of claim 20, wherein the computing device is operable to perform one or more of: a communication function, a data gathering function or a coded image decoding function.

26. The computing device of claim 25, wherein the power management circuitry is operable to disable one or more of: a communication function, a data gathering function or a coded image decoding function.

27. The computing device of claim 20, wherein the one or more operating characteristics comprises a temperature measurement.

28. The computing device of claim 20, wherein the one or more operating characteristics comprises a battery charge level.

* * * * *